United States Patent [19]

Wisner

[11] 3,725,610

[45] Apr. 3, 1973

[54] ROTATABLE MAGNETIC TRANSDUCER HEAD

[76] Inventor: Kenneth R. Wisner, 263-A West 12th St., New York, N.Y. 10014

[22] Filed: Jan. 27, 1971

[21] Appl. No.: 110,075

[52] U.S. Cl. ....................... 179/100.2 C, 179/100.2 T

[51] Int. Cl. ......... G11b 5/10, G11b 5/28, G11b 5/52

[58] Field of Search .. 179/100.2 C, 100.2 K, 100.2 T, 179/15.55 T; 178/6, DIG. 3

[56] References Cited

UNITED STATES PATENTS

| | | | |
|---|---|---|---|
| 2,661,397 | 12/1953 | Berens et al. | 179/100.2 T |
| 2,539,837 | 1/1951 | Howell | 179/100.2 T |
| 2,352,023 | 6/1944 | Schuller | 179/100.2 T |

*Primary Examiner*—Bernard Konick
*Assistant Examiner*—Robert S. Tupper
*Attorney*—Hane, Baxley & Spiecens

[57] ABSTRACT

Supported within a cylindrical housing are first and second magnetic pole members which are displaced from each other along the axis of the housing. Each pole member has at least one transducing gap. The gaps are opposite rotationally displaced openings in the housing. The transducer head is rotatable about the axis of the cylindrical housing. There is disclosed a two-gap and a four-gap embodiment of the transducer head.

3 Claims, 5 Drawing Figures

INVENTOR.
KENNETH R. WISNER
BY Hanes, Bayley and Spiecens
ATTORNEYS

ROTATABLE MAGNETIC TRANSDUCER HEAD

This invention pertains to magnetic transducer heads and, more particularly, to multigap rotatable magnetic transducer heads.

Multigap rotatable magnetic transducer heads are used in systems to accelerate or decelerate the speed of playback of audio signals on magnetic tape without a change in pitch. Deceleration of reproduction can be used by stenographers or language students while acceleration of reproduction is ideally suited in communication systems and, in fact, has become known as "-compressed speech." Compressed speech is now being used to present tutorial material, particularly to the blind.

An excellent survey of the theory can be found in "-Duration and/or Frequency Alteration" by W. S. Marlens in the Audio Engineering Society Preprint No. 412, while the details of a working system can be found in U. S. Pat. No. 2,886,650. Since the present invention is only concerned with a rotatable magnetic transducer head for such systems, the theory of audio speed changing will not be discussed in detail but the reader is referred to the above-cited references.

In such systems, a magnetic tape is moved over an arcuate portion of a multigap rotating magnetic head. The relative velocity between the peripheral speed of the magnetic head and the linear velocity of the magnetic tape must be the same as the velocity of the magnetic tape during the initial recording process with a stationary recording head. When the absolute velocity of the magnetic tape is increased to shorten the playback time and the relative velocity between the periphery of the rotating magnetic head and the magnetic tape is kept at a given value certain portions (the discard intervals) of the recording, because of the angular displacements of the gaps of the multigap magnetic head, are periodically omitted. It has been found that as long as the discard intervals are less than 40 milliseconds, they are undetected by the human ear. Therefore, to prevent the sensation of staccato speech, the discard intervals should be less than 40 milliseconds. It can be shown that the duration of the discard intervals is a function of the velocity of the magnetic tape and the peripheral displacement of the multiple gaps. For a given number of gaps, the slower the magnetic tape moves the smaller must be the peripheral displacement between adjacent gaps. For example, for a tape moving at 15 inches per second, the intergap displacement must be as small as 15½ millimeters, while for a tape moving at 7½ inches per second the displacement between adjacent gaps of the rotatable magnetic head must be 7¾ millimeters. The phenomenon is discussed in the introduction of U. S. Pat. No. 3,022,383. Since it is desirable to have a slow moving magnetic tape because less power is required to move the magnetic tape and less magnetic tape is required for the recording, one must make the peripheral spacing between adjacent gaps as small as practicable. The gap spacing can be made smaller by increasing the number of gaps and/or by making the diameter of the rotatable magnetic head as small as practicable.

The multigap rotatable magnetic heads heretofore available have been either relatively large or were difficult to manufacture and assemble. In addition, it was difficult to align the gaps. All these complexities resulted in expensive compressed speech tape recorders. It has been found that if such a recorder can be made relatively inexpensive, there is a large market for students and blind people.

Therefore, there is a definite need for providing an inexpensive rotatable magnetic transducing head and it is an object of the invention to satisfy this need.

Briefly, the invention contemplates a rotatable magnetic transducer head wherein at least two magnetic pole members are supported in axially spaced relationship within a cylindrical housing. Each of the pole members has a transducer gap. The transducer gaps of the respective pole members are rotationally displaced from each other.

Other objects, the features and advantages of the invention will be apparent from the following detailed description when read with the accompanying drawing which shows two presently contemplated embodiments of the invention.

Figures 1, 3, 4:
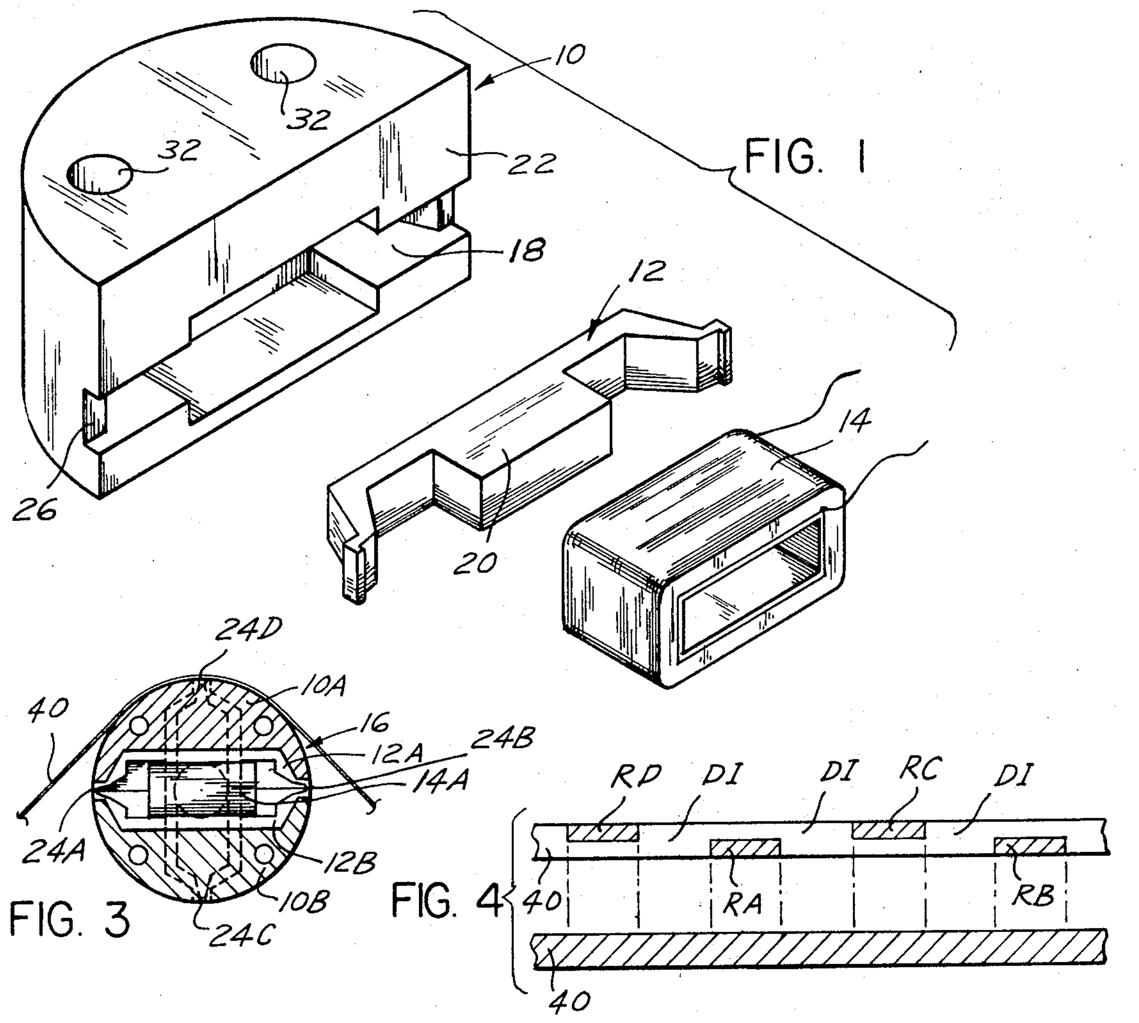
FIG. 1 is a perspective view of the basic components of a first embodiment of the rotatable magnetic transducer head in accordance with the invention.
FIG. 3 is a cross-sectional view taken along the line 3—3 of FIG. 2.
Figure 5:
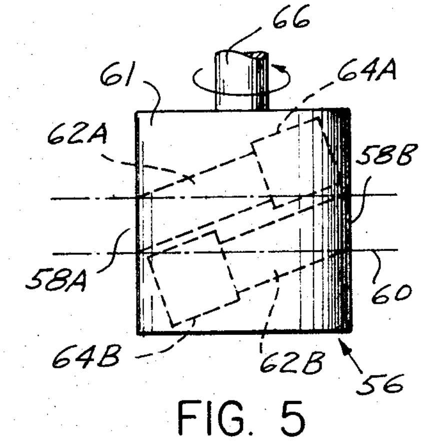

FIG. 4 schematically shows two strips of magnetic tape used in explaining the operation of the rotatable magnetic transducer head of FIG. 1; and FIG. 5 shows a side elevation of another embodiment of the rotatable magnetic transducer head according to the invention.

Figure 2:
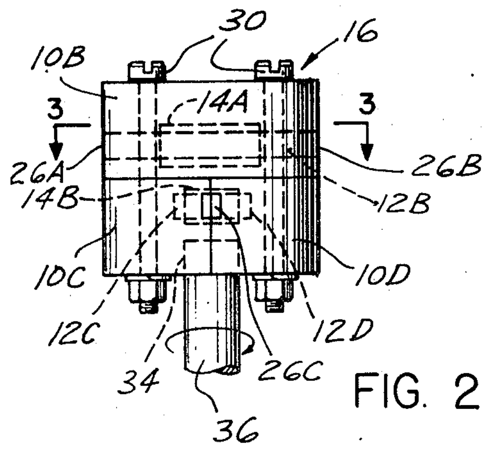
FIG. 2 is a side elevation of the assembled rotatable magnetic transducer head of FIG. 1.

In FIG. 1, the three basic components that form a rotatable magnetic transducer head are shown as quarter-housing element 10 of semi-circular cross-section, the half magnetic pole element 12 and the winding 14. To form the four gap rotatable magnetic transducer head 16 of FIGS. 2 and 3, four housing elements 10, four pole elements 12 and two windings 14 are required. In FIGS. 2 and 3 the same elements will carry the respective reference numeral followed by a letter subscript.

The transducer head 16 is formed by inserting the pole element 12A in the cavity 18 of housing element 10A. The winding 14A is slipped over the yoke portion 20 of pole element 12A. Then, pole element 12B is inserted in cavity 18 of housing element 10B and the face 22 of housing element 10A is placed flush against the corresponding face of housing element 10B. In this way, the first half of the transducer head 16 is assembled. It should be noted that the tips of the pole elements 12A and 12B define two diametrically opposite and coplanar transducer gaps 24A and 24B which are at peripheral openings 26A and 26B in the housing elements 10A and 10B.

The second half of the transducer head 16 is assembled in the same way utilizing housing elements 10C and 10D, pole elements 12C and 12D and winding 14B. The two halves are aligned coaxially and then rotated about their common axis until the gaps of each half are ninety degrees apart. The halves are fixed together by means of bolts 30 and through holes 32. Thereafter, a hole 34 is axially drilled in the exposed face of either half to accept a rotary drive shaft 36 which can be pinned or keyed. It should be noted that the finally assembled head has four transducer gaps 24A, 24B, 24C and 24D which are 90° apart along the circumferential periphery of a cylindrical housing with the coplanar gaps 24A and 24B axially displaced from the coplanar gaps 24C and 24D.

Although no detail is shown for connecting the windings 14A and 14B to external amplifiers, it should be realized that the two windings can be connected in series, or parallel, and thereafter connected by leads through an axial channel to a slip ring device or the like.

The operation of the head 16 will now be described with the aid of FIG. 4. The initial recording on magnetic tape 40 is across the entire surface of the tape as indicated by the hashed lines. To read tape 40, the tape is biased against head 16 such that the tape is in contact with a 90° sector of the peripheral surface as shown in FIG. 3. As the tape 40 moves from left to right in FIG. 3 over clockwise rotating head 16, gap 24D reads portion RD of tape 40 followed by a discard interval DI, gap 24A reads portion RA followed by another discard interval DI, gap 24C reads portion RC followed by another discard interval DI, and gap 24B reads portion RB followed by yet another discard interval DI. Thereafter, the cycle repeats. Since the same information at any longitudinal point on the tape is recorded transverse across the tape, each gap reads the information it normally would if all gaps lay in the same plane. (It should be noted that the length of the discard intervals is exaggerated and should not be taken as representative.)

A compact two-gap rotating magnetic transducer head 56 is shown in FIG. 5 wherein the diametrically opposite transducer gaps 58A and 58B lie in the same plane to read the entire transverse dimension of tape 60. To minimize the diameter of cylindrical housing 61, each magnetic pole member 62A and 62B and its associated winding 64A and 64B lie in parallel axially displaced planes which make an acute angle with the axis of the housing 61. A shaft 66 coaxially connected to housing 61 rotationally drives the transducer head 56.

While only two embodiments of the rotatable transducer head have been shown there will now be obvious to those skilled in the art many modifications and variations which satisfy many or all of the objects of the invention but which do not depart from the spirit thereof as defined by the appended claims. For example, the actual assembly of the heads can be different from that described and still provide a head which comes within the scope of the claims. In particular, each transducing gap can be defined by a separate pole piece with its own distinct winding. Furthermore, although the head has been described as a reproducing head it could equally be used as a recording head.

What is claimed is:

1. A rotatable magnetic transducer head comprising: four members, each of said members comprising a semi-cylindrical housing with a planar face in the diametric plane of the cylinder and first and second end faces, said housing being provided with a cavity opening onto the planar face and onto gap regions of the cylindrical surface adjacent each end of the planar face, and two pole tip elements within said cavity, each pole tip element extending into a different one of the gap regions; means for connecting pairs of said members such that the planar faces of the members of each pair are in abutting relationship to form full cylinders with corresponding pole tip elements opposite each other to form two magnetic circuit gaps and such that the full cylinders abut each other along end faces and the planar faces of one pair of members are orthogonal to the planar faces of the other pair of members whereby the four formed magnetic circuit gaps are 90° apart around a cylindrical periphery; winding means electromagnetically compled to said pole tip elements; and said two pole tip elements are at opposite ends of a unitary magnetic pole element having an intermediate yoke portion and said winding means is disposed about said yoke portion.

2. The rotatable magnetic transducer head of claim 1 further comprising means for rotating the transducer head about the cylindrical axis.

3. The rotatable magnetic transducer head of claim 2 further comprising a magnetic tape having a single phased recording thereon and positioned opposite the magnetic circuit gaps.

* * * * *